United States Patent
Seufert et al.

(10) Patent No.: US 8,620,513 B2
(45) Date of Patent: Dec. 31, 2013

(54) ACTUATOR ARRANGEMENT FOR A MOTOR VEHICLE DRIVE TRAIN AND METHOD FOR OPERATING AN ACTUATOR ARRANGEMENT

(75) Inventors: Martin Seufert, Steinhem (DE); Michael Gerhard Ludwig, Sinsheim (DE); Volker Naegele, Schoenwald (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 788 days.

(21) Appl. No.: 12/338,153

(22) Filed: Dec. 18, 2008

(65) Prior Publication Data
US 2009/0164058 A1    Jun. 25, 2009

(30) Foreign Application Priority Data
Dec. 20, 2007    (DE) .................. 10 2007 063 212

(51) Int. Cl.
*G01M 17/00*    (2006.01)
*B60T 7/12*    (2006.01)
*F16D 19/00*    (2006.01)
*F16D 13/68*    (2006.01)
*B60W 10/00*    (2006.01)

(52) U.S. Cl.
USPC ............. 701/29.1; 701/29.2; 701/99; 192/94; 192/98; 192/115; 477/77; 477/86

(58) Field of Classification Search
USPC ............... 701/29, 99, 29.1; 192/20, 40, 48.2, 192/48.8, 93, 94, 98, 115; 477/77, 86
See application file for complete search history.

(56) References Cited

U.S. PATENT DOCUMENTS

| | | | | |
|---|---|---|---|---|
| 5,481,906 A | * | 1/1996 | Nagayoshi et al. | 73/114.61 |
| 5,806,646 A | * | 9/1998 | Grosspietsch et al. | 192/70.252 |
| 5,847,272 A | * | 12/1998 | Schneider et al. | 73/115.02 |

(Continued)

FOREIGN PATENT DOCUMENTS

| | | |
|---|---|---|
| DE | 10030085 | 3/2002 |
| DE | 10120899 | 10/2002 |

(Continued)

OTHER PUBLICATIONS

European Search Report for European Application No. 08170359.7, dated Oct. 25, 2010.

*Primary Examiner* — James Trammell
*Assistant Examiner* — Majdi Alsomiri
(74) *Attorney, Agent, or Firm* — Knobbe, Martens, Olson & Bear, LLP

(57) ABSTRACT

An actuator arrangement for a motor vehicle drive train has a control device, an electric actuator and a drive circuit for the actuator. The drive circuit receives at least one nominal signal relating to an actuator from the control device and converts it into a drive signal for the actuator. The control device is checked for faults by means of a monitoring device. The drive circuit and/or a power stage which is arranged between the drive circuit and the motor receives a reset signal when such a fault occurs. Further, the control device is configured to check the function of the drive circuit and to generate a reset signal for the drive circuit and/or for the power stage if a malfunction occurs.

19 Claims, 4 Drawing Sheets

(56) References Cited

U.S. PATENT DOCUMENTS

| | | | |
|---|---|---|---|
| 5,857,443 A * | 1/1999 | Kono et al. | 123/339.2 |
| 5,979,630 A * | 11/1999 | Nyquist et al. | 192/84.91 |
| 5,991,680 A * | 11/1999 | Kono et al. | 701/67 |
| 5,996,754 A * | 12/1999 | Reed et al. | 192/48.2 |
| 6,047,805 A * | 4/2000 | Nyquist et al. | 192/84.81 |
| 6,691,850 B2 * | 2/2004 | Aschoff et al. | 192/84.6 |
| 6,871,129 B2 * | 3/2005 | Kitaori et al. | 701/51 |
| 2002/0016232 A1 * | 2/2002 | Amisano et al. | 477/77 |
| 2002/0026271 A1 | 2/2002 | Ebashi | |
| 2003/0075412 A1 * | 4/2003 | Heiartz et al. | 192/20 |
| 2004/0231947 A1 * | 11/2004 | Baehr | 192/84.6 |
| 2004/0236537 A1 * | 11/2004 | Eich et al. | 702/182 |
| 2005/0082918 A1 | 4/2005 | Hirt et al. | |
| 2006/0080019 A1 | 4/2006 | Eich et al. | |
| 2006/0169561 A1 * | 8/2006 | Ooishi et al. | 192/70.27 |
| 2006/0223672 A1 | 10/2006 | Kumazawa | |
| 2007/0139834 A1 | 6/2007 | Pfund et al. | |
| 2007/0199755 A1 * | 8/2007 | Takeuchi | 180/221 |
| 2008/0006107 A1 * | 1/2008 | Dreher et al. | 74/329 |
| 2008/0153666 A1 * | 6/2008 | Fahland et al. | 477/107 |

FOREIGN PATENT DOCUMENTS

| | | |
|---|---|---|
| DE | 10237167 | 3/2003 |
| DE | 103 16 442 | 10/2003 |
| WO | WO 01/98689 | 12/2001 |
| WO | WO 03/019047 | 3/2003 |

* cited by examiner

ACTUATOR ARRANGEMENT FOR A MOTOR VEHICLE DRIVE TRAIN AND METHOD FOR OPERATING AN ACTUATOR ARRANGEMENT

CROSS-REFERENCE TO RELATED APPLICATIONS

This application claims the priority of German patent application DE 10 2007 063 212 filed Dec. 20, 2007.

BACKGROUND OF THE INVENTION

The present invention relates to an actuator arrangement for a motor vehicle drive train, having a control device, an actuator and a drive circuit for the actuator, which drive circuit receives at least one nominal signal relating to an actuator variable from the control device and converts it into a drive signal for the actuator, wherein the control device is checked for faults by means of a monitoring device, and wherein the drive circuit and/or a power stage which is arranged between the drive circuit and the actuator receives a reset signal when such a fault occurs.

The invention also relates to a corresponding method for operating such an actuator arrangement.

In automated motor vehicle drive trains, clutches are frequently activated by means of an electric motor. The clutches can, for example, be gear input-end friction clutches such as starting clutches. The clutches can, however, also be clutches for shifting gear speeds of a gearbox. In addition, the clutches can be embodied as friction clutches or friction brakes for an automatic torque converter transmission.

The known actuator arrangements include a control device which can be configured, for example, as a clutch controller or gearbox controller and which activates the clutch (and if appropriate further clutches) on the basis of a superordinate control strategy. The control device can be connected to a superordinate control unit, which is assigned to the drive train, and/or said control device can communicate with a drive control device for a drive engine of the drive train (for example an internal combustion engine or a hybrid drive). If faults occur in the control device, a monitoring device (for example a watchdog module) ensures that a reset signal is generated. The reset signal can be used to drive the actuator in such a way that the assigned clutch is placed in a basic state. This can be done, for example, by virtue of the fact that the drive circuit and/or a power stage receive a reset signal in the form of a deactivation signal.

The drive circuit is embodied as a circuit which is separate from the control device, for example as an independent microcontroller and/or as an independent circuit which is constructed with hardware components (for example using an ASIC module). Such modules can convert simple predefined nominal values into complex drive signals for the electric actuator.

The actuator can be an electric actuator such as an electric motor and/or an electromagnetic actuator.

Although the monitoring device which is provided for the control device already provides a high level of reliability, it is desirable to improve the reliability.

BRIEF SUMMARY OF THE INVENTION

The object of the invention is consequently to specify an improved actuator arrangement and an improved method for operating such an actuator arrangement which can increase reliability.

The above object is achieved with the actuator arrangement mentioned in the beginning in that the control device is configured to check the function of the drive circuit and to generate a reset signal for the drive circuit and/or for the power stage if a malfunction occurs.

The invention is also achieved by a corresponding method for operating such an actuator arrangement.

According to the prior art, if there is a fault in the drive circuit, faulty signals relating to the status of the actuator can, under certain circumstances, be transmitted to the superordinate control device. This can lead to a faulty behaviour which cannot be detected and consequently cannot be dealt with either.

The measure of checking the function of the drive circuit in the control device and of generating a reset signal if a malfunction occurs in the drive circuit allows such a fault in the drive circuit to be detected. In addition, the actuator can be placed in a basic state which can be dealt with. For example, the actuator can be deactivated, with the result that the component which is driven by means of the actuator (for example a clutch) is placed in a basic state. In the case of a clutch, a mechanical energy store frequently ensures that when faulty driving occurs the clutch is placed in such a basic state, as a rule in a basic state in which the clutch is opened and/or a basic state in which the clutch is placed in a neutral state.

The present invention is of particular importance in the application in motor vehicle drive trains with a double clutch transmission. In the gear input-end friction clutches which are used in this context, dry or wet-running clutches (for example multi-disc clutches) in such double clutch transmissions are activated in an overlapping fashion, wherein the drive torque can be transmitted from one of the friction clutches to the other without an interruption in traction force. Incorrect control operations of the clutches can lead here to stresses in the drive train.

The measure of monitoring the drive circuit of the actuator arrangement in the superordinate control device allows such stress states to be consequently avoided.

Of course, if a malfunction occurs in the drive circuit, a reset signal can, if appropriate, additionally be generated for the entire system.

In addition, the control device can, of course, transmit a reset signal to a separately provided reset module, which then in turn generates reset signals. The reset signals can be deactivation signals or else reset signals for microcontrollers, etc.

The above object is consequently achieved completely.

It is particularly preferable if the control device is configured to receive a control signal from the actuator and to check the control signal to determine whether the drive circuit is functioning correctly. The control signal can be based on a sensor arrangement which is specifically provided for the actuator arrangement according to the invention. However, the control signal can also be based on information which originates from a sensor device which is arranged in any case in the region of the actuator.

The basic idea of this method of monitoring the drive circuit is consequently based on feeding information about the state of the actuator to the control device independently of the drive circuit. In this context, the drive circuit of course likewise receives the same or similar information from the actuator in order to be able to drive the latter in the manner of a fed-back closed-loop control system.

It is of particular advantage here if the control device is configured to receive a further signal from the drive circuit and to evaluate the control signal and the further signal to determine whether the drive circuit is functioning correctly.

In this embodiment, the drive circuit transmits information to the control device, and this information which is contained in the further signal is evaluated together with the control signal. As a result, it is possible to interrogate whether the drive circuit is operating correctly.

It is particularly preferable here if the further signal is an actual value signal relating to an actuator variable.

The actual value signal can, for example, be based on information in the drive circuit about the state of the actuator, wherein the drive circuit receives this information from a sensor device of the actuator.

In addition it is advantageous if the actual value signal is a digital signal.

In particular it is advantageous if the actual value signal is such a signal which can transmit information about the actuator over an individual line. The actual value signal can be a pulse signal (for example one pulse per commutation), a frequency signal (for example frequency proportional to the rotational speed), a TWM signal (for example one pulse per commutation and pulse width as a function of the rotational direction) or the like.

According to a further preferred embodiment, the control signal has a digital signal from at least one sensor.

The sensor is preferably assigned to the actuator. In the case of an electric motor, this can be, for example, a Hall sensor arrangement. Such a Hall sensor arrangement can particularly preferably be used in conjunction with a brushless electric motor which has permanent magnets in the rotor. The movement of the permanent magnets can be sensed particularly easily by means of the Hall sensor arrangement.

According to a further preferred embodiment, the control signal has a plurality of digital signals which monitor the state of the actuator.

For example, a sensor arrangement for the actuator can be a Hall sensor arrangement with a plurality of Hall sensors which, for example, are arranged distributed over the circumference. With such a Hall sensor arrangement it is possible to measure the rotational speed and the rotational direction and/or the rotational position of the electric motor.

According to a further preferred embodiment, the digital control signal is accordingly a digital commutation signal.

Such a commutation signal can, for example, be sensed by a Hall sensor arrangement as described above. Generally, the commutation signal can, however, also be sensed by means of a sensor which senses the electrical commutation of an electric motor which has brushes for electrical commutation.

In addition, it is preferred overall if the digital control signal is fed to a converter device which converts the digital control signal into a control signal which is fed to the control device.

Such a converter device can convert the digital control signal coming from the sensor into an analogue or digital signal which is suitable for the control device, and said converter device can operate, for example, in the manner of a digital/analogue converter and feed an analogue control signal to the control device, which analogue control signal can be processed in the control device comparatively easily. The converter device can be embodied as a separate component or can be integrated into a sensor arrangement which is assigned to the motor.

It is of particular advantage here if the control signal contains information about the status of the actuator, in particular about the rotational direction and/or about the rotational speed and/or rotational position of the actuator.

According to a further preferred embodiment, the nominal signal which is transmitted to the drive circuit by the control device is an analogue signal.

It is also advantageous here if the actual value signal and the nominal signal are transmitted on a bidirectional line between the control device and the drive circuit.

Of course, one line can be provided per status information item. Alternatively it is also possible to transmit a plurality of status information items (for example rotational speed and rotational direction) over one bidirectional line.

In addition it is advantageous if the actuator is embodied as a motor and has a predefined rotational speed range, wherein the control device and/or a converter device which converts the control signal into a control signal for the control device is configured to process the control signal up to a first predefined rotational speed within the rotational speed range in such a way that the rotational speed of the motor can be reproduced exactly from the processed control signal, and wherein, above the first predefined rotational speed, a plausibility-checking device in the control device and/or in the converter device checks the processed control signal to determine whether the resulting rotational speed is within a predefined rotational speed band or accuracy band.

In this embodiment, the drive circuit can be checked by means of the plausibility-checking device even if the available computing power is not sufficient to obtain exact information about the rotational speed of the motor over the entire predefined rotational speed range. The first predefined rotational speed may be lower here than a rotational speed which can no longer be reproduced at all per se according to the Nyquist criterion. When such a Nyquist rotational speed is approached, the accuracy decreases. Despite this reduced accuracy, it is possible to use the plausibility-checking device to check whether the drive circuit is operating correctly.

Even if the information about the state of the motor, which corresponds to the control signal, cannot be made available in a chronologically corresponding fashion by the drive circuit, it is possible, in any event above the first predefined rotational speed, to draw conclusions about the operation of the drive circuit by means of the plausibility-checking device.

It is particularly advantageous here if the rotational speed band or accuracy band is larger the greater the degree by which the rotational speed which results from the processed control signal differs from the first predefined rotational speed.

Consequently, at rotational speeds which are slightly above the first predefined rotational speed it is possible to check with relatively high accuracy whether the drive circuit is operating correctly. This accuracy then decreases at higher rotational speeds.

According to a further preferred embodiment, the motor which is embodied as an actuator has a predefined rotational speed range, wherein the control device and/or a converter device which converts the control signal into a control signal for the control device is configured to process the control signal up to a second predefined rotational speed within the rotational speed range, in such a way that the Nyquist criterion is met, and wherein, above the second predefined rotational speed, a plausibility-checking device in the control device and/or in the converter device checks whether it is plausible that the rotational speed is above the second predefined rotational speed.

By means of this embodiment, it is also possible to check whether the drive circuit is operating correctly if the computing power is, for example, not sufficient, at relatively high speeds, to sense the rotational speed of the motor or establish a chronological relationship between the control signal and information which comes from the drive circuit. In this context, it is possible, for example, to resort to previous states in the plausibility-checking device in order to check whether the drive circuit is operating correctly.

It is therefore preferred that, if the rotational speed was previously in a rotational speed band below the second predefined rotational speed, the plausibility-checking device detects it as plausible that the rotational speed is above the second predefined rotational speed.

It is advantageous overall if the drive circuit has an ASIC module.

Such a module can be used to adapt the drive circuit to the respective actuator and to make it compact.

According to a further preferred embodiment, the actuator is a brushless electric motor.

As already explained above, in the case of a brushless motor a commutation signal can be derived from a sensor arrangement, in particular a Hall sensor arrangement.

In the above-described embodiments, the approach generally followed is that sensor signals from an actuator are converted in a converter device and input into the control device. In the control device, a comparison is carried out between information about the state of the motor which is transmitted via the converter device and state information which is read out from the drive circuit, specifically in the control device.

In this context, the quality of the comparison is dependent on the speed or rotational speed.

According to an alternative embodiment, a comparison which is independent of speed can be carried out if the control device is configured to compare a state signal from the actuator with a state signal of the drive circuit simultaneously or in a chronological assignment to one another, in order to check the function of the drive circuit.

This generally requires the signals from the actuator and from the drive circuit to be placed in relation to one another by means of suitable synchronization devices (for example synchronization signals on synchronization lines).

This alternative embodiment can be used as an alternative to the first mentioned embodiments or in addition to them.

In the alternative embodiment it is possible, if a synchronization signal is transmitted between the control device and the drive circuit, for a chronological assignment between the state signals to be effected in the control device.

On the basis of the synchronization signal, the comparison of the state signals can be carried out independently of the motor speed and independently of the Nyquist criterion.

Of course, the features mentioned above and the features to be explained below can be used not only in the respectively specified combination but also in other combinations or alone without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
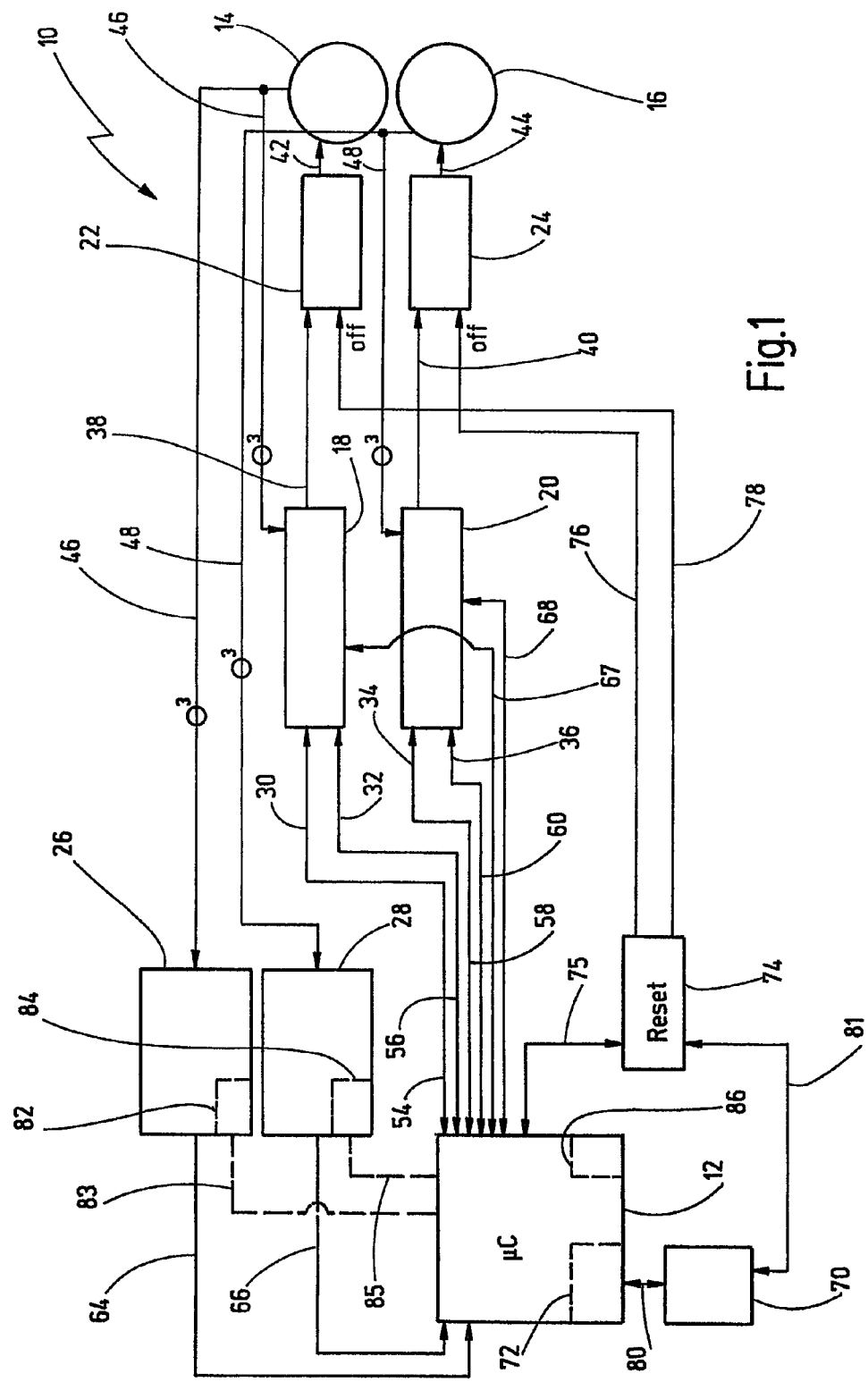
FIG. 1 shows a schematic block circuit diagram of an actuator arrangement according to an exemplary embodiment of the invention.

In FIG. 1, a first embodiment of an actuator arrangement according to the invention is denoted generally by 10. The actuator arrangement 10 has a control device 12 which contains a microcontroller or microprocessor and is configured to process computer programs.

The actuator arrangement 10 is configured to drive the two clutches of a double clutch transmission for a motor vehicle. For this purpose, the actuator arrangement 10 has two actuators in the form of a first electric motor 14 and in the form of a second electric motor 16. However, of course, an actuator arrangement according to the invention can have, in the same way, actuators in the form of hydraulic actuators and/or in the form of electromagnetic actuators. In addition, an actuator arrangement according to the invention can, of course, have, in the same way, just a single actuator. Finally, the actuator arrangement according to the invention is, of course, configured in particular for use in motor vehicle drive trains, but can also be used in other application areas. In motor vehicle drive trains, an actuator arrangement according to the invention can be used both to drive friction clutches such as starting clutches and also to drive clutches in the transmission and/or to drive clutches or brakes in automatic torque converter transmissions. An application to the actuator system of stepless transmissions is also conceivable, for example when actuating a pair of taper discs or toroidal gear discs.

The actuator arrangement 10 in FIG. 1 also contains a first drive circuit 18 and a second drive circuit 20. The drive circuits 18, 20 are provided as separate assemblies which are provided functionally and/or spatially separated from the control device 12. The drive circuits 18, 20 serve to convert nominal signals for the motors 14, 16 into suitable drive signals for these motors. The drive circuits 18, 20 can be constructed for this purpose as hardware circuits with discrete components, in particular with application-specific components (ASICs for short). However, it is generally also conceivable for the drive circuits 18, 20 to contain an independent "intelligence", for example in the form of a microcontroller or the like.

In order to drive the motors 14, 16, the actuator arrangement 10 also includes a first power stage 22 and a second power stage 24. Power stages 22, 24 are configured to convert control signals (which are usually present at a low level) into power signals for the motors 14, 16.

In addition, the actuator arrangement 10 contains a first converter device 26 and a second converter device 28 which connect sensors (not denoted in more detail) of the motors 14, 16 to the control device 12.

The motors 14, 16 can be embodied as brush-commutated direct current motors but they are preferably brushless electric machines whose rotors have permanent magnets. The method of functioning of such motors is generally known so that details on it will not be given here.

The motors 14, 16 are controlled in terms of their states in relation to the rotational direction, in relation to the rotational speed and/or in relation to the rotational path (rotational angle).

For this purpose, the control device 12 is connected to the drive circuits 18, 20 over bidirectional lines. The drive circuits 18, 20 respectively receive a first motor nominal value 30, 34 relating to the rotational direction and a second motor nominal value 32, 36 relating to the rotational path (and/or the rotational speed) via these bidirectional lines. In the drive circuits 18, 20, these motor nominal values are respectively converted into drive signals 38, 40 which are transmitted to the power stages 22, 24. The power stages 22, 24 respectively generate from said drive signals 38, 40 an actuation signal 42, 44 which is applied to coils of the motors 14, 16.

The motors 14, 16 respectively have sensors which monitor the state of the motors 14, 16. The sensors (which are not illustrated in the figures) can, for example, contain a Hall sensor arrangement for each of the motors 14, 16. Such a Hall sensor arrangement includes, for example, two, three or more Hall sensors which are arranged over the rotational circumference of the respective motor 14, 16. The Hall sensors are configured to sense the rotation of the rotor which, as stated above, is preferably equipped with permanent magnets.

The sensors transmit actual value signals 46, 48 relating to the respective state of the motors 14, 16 to the drive circuits 18, 20. As a result of this feedback, it is possible for the drive circuits 18, 20 to perform closed-loop control of the state of the motors 14, 16.

In addition, the drive circuits 18, 20 respectively transmit the state of the motor to the control device 12. In the present case, this is done over the bidirectional lines in the form of respective first motor actual values 54, 58 (for example relating to the rotational direction) and second motor actual values 56, 60 (for example relating to the rotational path or the rotational speed). In other cases, the state of the respective motor can be transmitted by the respective drive circuit 18, 20 over an individual bidirectional line.

Consequently, information about the respective state of the motors 14, 16, specifically about the actual values 54-60 transmitted by the drive circuits 18, 20, is present in the control device 12. The control device 12 can consequently carry out the superordinate control with knowledge of these states.

The sensors of the electric motors 14, 16 are, as mentioned above, also connected to a first converter device 26 and to a second converter device 28. In the present case, the sensor arrangement can, for example, contain three sensors so that the actual value signals 46, 48 are transmitted, for example, over three conductors to the drive circuits 18, 20 or to the converter devices 26, 28.

The converter devices 26, 28 generate, from the respective actual value signals 46, 48, analogue control signals 64, 66 which are respectively input into the control device 12. The control device 12 consequently receives information about the state of the motors 14, 16, not only via the drive circuits 18, 20 but also additionally via the converter devices 26, 28. On the basis of this additional information, the control device 12 can detect whether the drive circuits 18, 20 are functioning correctly.

The control device 12 can also be respectively connected to the drive circuits 18, 20 by means of a synchronization signal 67, 68, which is explained in more detail below.

The actuator arrangement 10 also contains means for monitoring the function of the control device 12. This can, as illustrated, be what is referred to as a watchdog module 70. Alternatively or additionally to this, a monitoring program 72 can run in the control device 12, which monitoring program 72 checks the function of the control device 12.

The control device 12 is also connected to a reset component 74. The reset component 74 is a component which is informed about malfunctions in the actuator arrangement 10 and which can output reset signals if a fault occurs. A reset signal is to be understood here as being a signal which places another component in a basic state. In a microcontroller-controlled component this can lead, for example, to the component being restarted (rebooted). In other components, such a reset signal can be used to deactivate the component in order to achieve a deactivated state (basic state).

In the present case, the reset component 74 is connected to the power stages 22, 24 and, if a fault state occurs, it can transmit reset signals in the form of a first deactivation signal 76 and of a second deactivation signal 78 to the power stages 22, 24. If the power stages 22, 24 are deactivated in this way, the motors 14, 16 no longer apply any actuator force to the components (for example clutches) which are to be driven.

The components which are to be driven can, for example, be prestressed mechanically into a basic state so that if faulty driving by the electric motors 14, 16 occurs, a basic state of these components is achieved. The gear input-end clutches of a double clutch transmission can, for example, be prestressed into such a basic state by mechanical energy stores such as springs, in which basic state the clutches are opened (referred to as "normally open" state). In other words, by means of the reset component 74 it is possible to bring about opening of the clutches. As a result, if a fault, in particular a safety-related fault, occurs, a safe state of the double clutch transmission can be brought about.

Other clutches can also be prestressed into a different basic state, for example into a closed state ("normally closed" state).

The watchdog module 70 is connected over a bidirectional connection 80 to the control device 12 and can, for example, be configured to interrogate the control device 12 on a regular basis in order, in this way, to check the functional capability of the control device 12.

When the watchdog module 70 is used, it can be connected directly to the reset component 74 via a connection 81 so that the watchdog module 70 can initiate a reset and therefore deactivation of the power stages 22, 24. If the monitoring program 72 is used, a fault is detected directly in the control device 12 and is fed via a connection 75 to the reset component 74, which can then initiate a reset.

The reset component 74 can also be connected to further assemblies of the overall system (for example to a drive motor controller with clutch control devices, etc.)

Consequently, the function of the control device 12 can be checked in the actuator arrangement 10. If a fault occurs in the control device 12, a reset or deactivation of the power stages 22, 24 can be carried out by means of the reset component 74.

However, the function of the drive circuits 18, 20 cannot be checked in this way. For this purpose, the converter devices 26, 28 are provided to feed the state signals from the electric motors 14, 16 directly to the control device 12. In the control device 12, these state signals can be compared by the sensors with state signals which are transmitted to the control device 12 by the drive circuits 18, 20.

If the drive circuits 18, 20 are operating incorrectly, the fed-back actual values 54-60 would also be incorrect or different from the state values which are transmitted by means of the control signals 64, 66. If such a fault state of the drive circuits 18, 20 is known, the control device 12 also initiates a reset via the connection 75 by means of the reset component 74, and consequently deactivates the power stages 22, 24.

The converter devices 26, 28 can, for example, contain high-speed digital/analogue converters which convert the actual value signals 46, 48 more or less simultaneously into corresponding analogue control signals 64, 66. The control device 12 is, however, possibly not configured to process rapid changes of the state of the motors 14, 16. The reason for this may be, for example, that inexpensive processors with correspondingly high processor powers are not available. This may lead to a situation in which the states of the motors 14, 16 which are transmitted via the sensors cannot be sensed accurately. In addition, at higher rotational speeds a chronological offset between the motor information from the control signals and the motor information from the drive circuits 18, 20 may occur.

In order, nevertheless, to be able to obtain definitive information about the state of the motors 14, 16 over a relatively large rotational speed range (that is to say even at relatively high rotational speeds and consequently when there are rapid changes in the states), plausibility-checking devices may be provided. For example, such a plausibility-checking device 86 can be provided in the control device 12. Alternatively it is also possible for such plausibility-checking devices 82, 84 to be respectively implemented in the converter devices 26, 28. In this case, the converter devices 26, 28 are preferably also connected to the control device 12 via suitable synchronization connections 83, 85.

The function of the plausibility-checking devices will be explained in more detail below.

Figure 2:
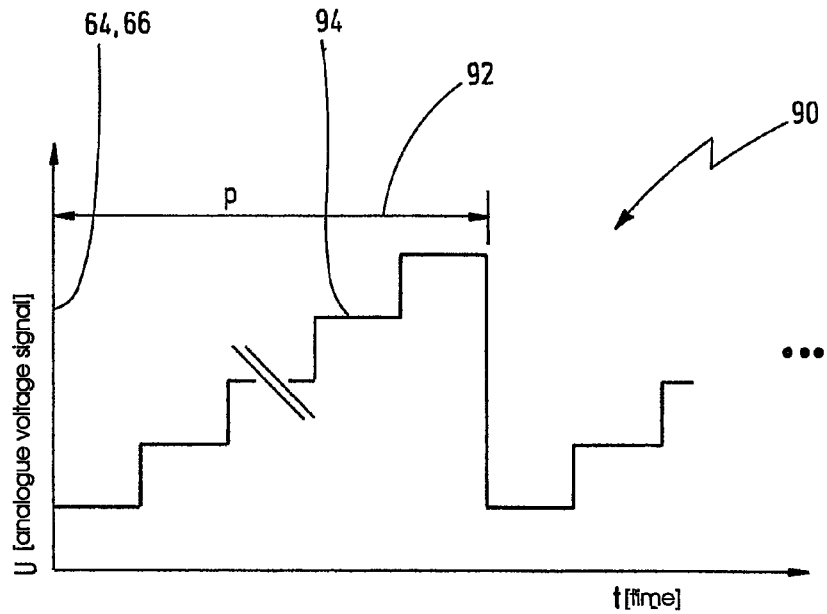
FIG. 2 shows an analogue output signal of a converter device of the actuator arrangement in FIG. 1 plotted over time.

FIG. 2 shows a diagram 90 which shows, plotted over time, the control signals 64, 66 which are transmitted by the converter devices 26, 28. The control signals 64, 66 are generated in the form of step signals which rise in a step shape over a period p. The period p corresponds here to what is referred to as an electrical rotation, which depends on the number of poles and other factors (number of Hall sensors, etc.). An electrical rotation can correspond here, for example, to a rotational angle of an electric motor 14, 16 of 7.5°. The control signals 64, 66 are present in the form of step signals, with each step being able to correspond to a commutation step of the respective motor 14, 16. Such step signals can be processed comparatively easily in the control device 12.

Figure 3:
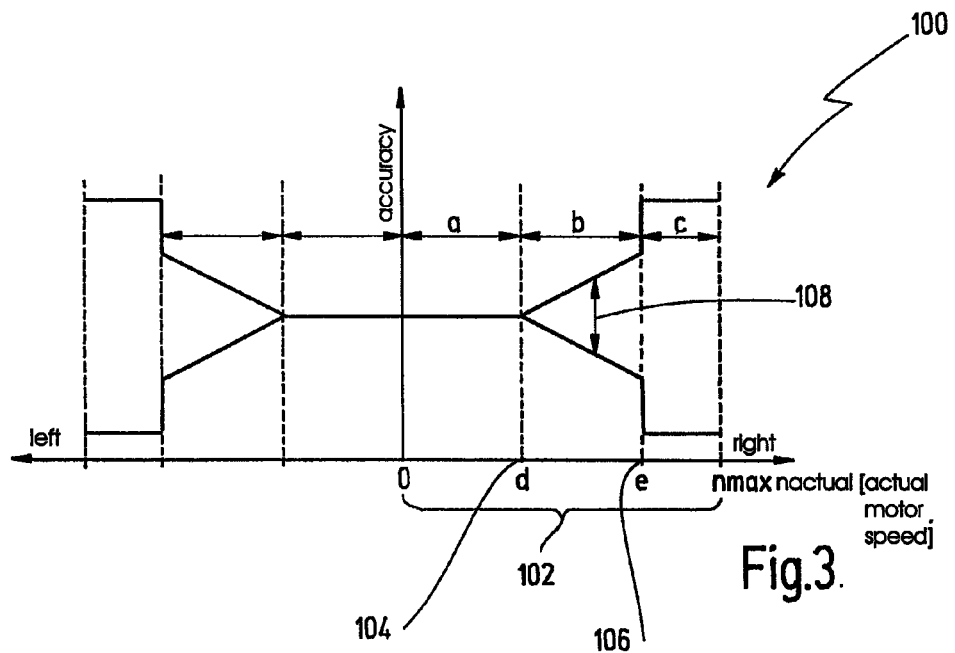
FIG. 3 is a diagram illustrating the achievable accuracy levels as a function of the rotational speed.

FIG. 3 shows a further diagram 100 which indicates the accuracy in relation to the rotational speed of the motors 14, 16. The rotational speed range which is monitored by the control device 12 is denoted by 102 here. The rotational speed range 102 is divided into a plurality of subranges, with a first range a extending from a rotational speed 0 to a first predefined rotational speed 104. The first predefined rotational speed may be a rotational speed which is so low that the control device 12 can respectively derive the accurate rotational speed of the respective motor 14, 16 with a chronological assignment (on the basis of the available processor power) from the control signals 64, 66 and the motor actual values 54-60. A second subrange b extends from the first predefined rotational speed 104 to a second predefined rotational speed 106 which is higher than the first predefined rotational speed. Above the second predefined rotational speed 106, the rotational speeds of the motors 14, 16 are so high because what is referred to as the Nyquist criterion or the condition of a chronological correlation can no longer be met. Above the second predefined rotational speed 106, the control device 12 is consequently no longer able to determine the rotational speed of the motors 14, 16.

In the second subrange, which is indicated by b in FIG. 3, the control device 12 cannot specify accurately the rotational speed of the respective motor 14, 16 but it can determine whether the rotational speed is within an accuracy band 108 which becomes larger and larger starting from the first predefined rotational speed 104 as far as the second predefined rotational speed 106 (the checking becomes increasingly inaccurate).

The abovementioned plausibility-checking devices 86 and 82, 84 can be configured to detect, through plausibility considerations, whether the actual rotational speed 50, 60 which is transmitted by the drive circuits 18, 20 is within the accuracy band 108 which applies for the respective rotational speed. If this is the case, it is assumed that the respective drive circuit 18, 20 is functioning correctly.

The plausibility-checking devices 86 and 82, 84 can also be capable of carrying out a plausibility consideration at rotational speeds above the second predefined rotational speed 106 in order to determine whether it is plausible that the rotational speed of the respective motor 14, 16 is actually within this rotational speed range (c in FIG. 3). For this purpose, the plausibility-checking devices 86 and 82, 84 can be configured to check whether the rotational speed of the respective motor 14, 16 was in the subrange b before this subrange c was reached. If this is the case, it is assumed to be plausible that the rotational speed which is currently being transmitted by the respective drive circuit 18, 20 is above the second predefined rotational speed 106.

In other words, by means of the plausibility-checking devices 86 and 82, 84 it is possible to bring about a situation in which the precise position or rotational speed of the respective electric motor 14, 16 does not have to be transmitted accurately over the entire rotational speed band 102 or only a small correlation, or no correlation, has to be present between the control signals 64, 66 and the motor actual values 54-60. This permits a saving in computing time to be achieved.

Figure 4:
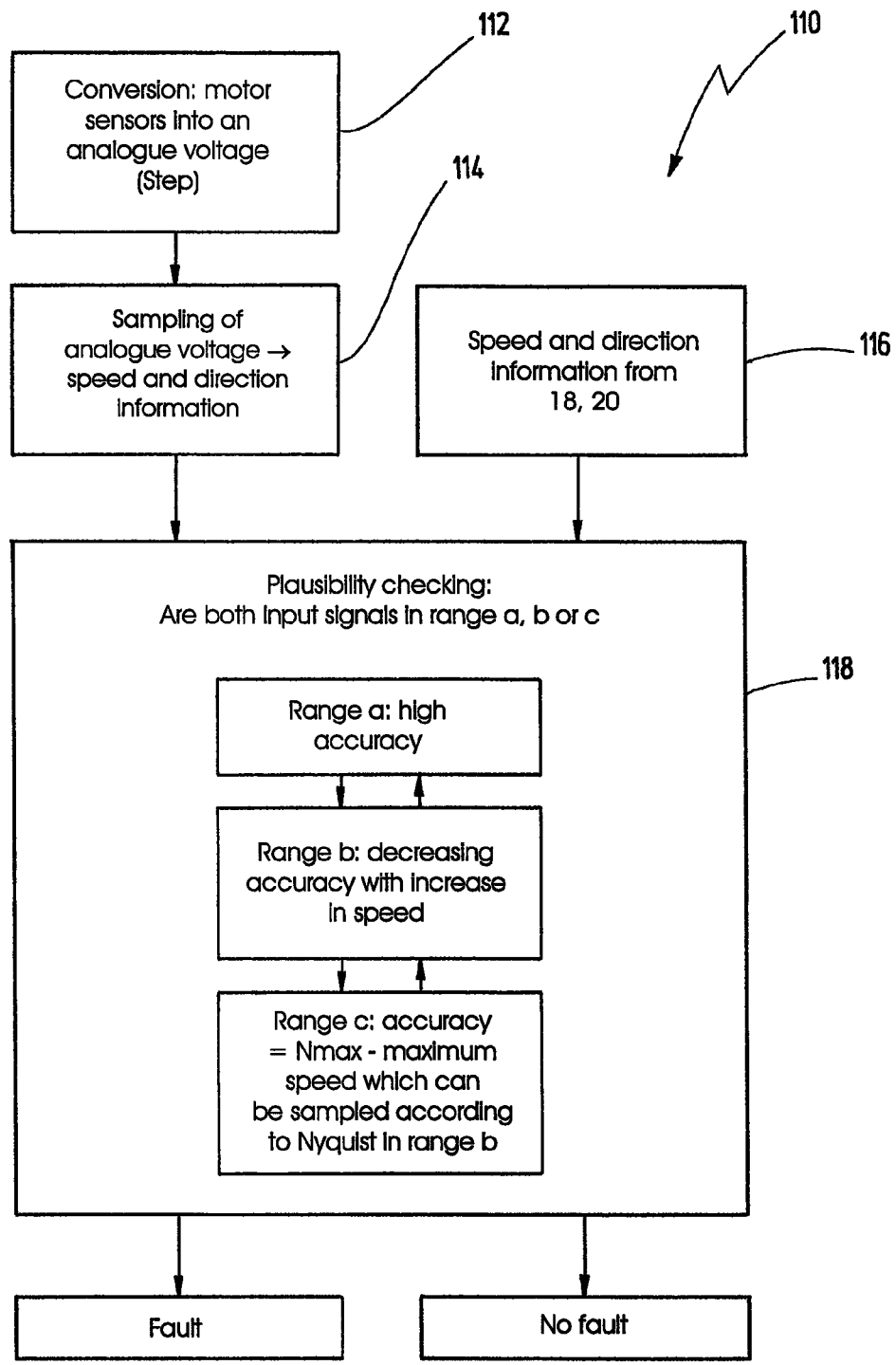
FIG. 4 is a schematic flowchart of the checking of the method of functioning of a drive circuit of the actuator arrangement in FIG. 1.

The general sequence for checking the drive circuits 18, 20 is illustrated in FIG. 4 in the form of a schematic flowchart 110.

In a step 112, the actual value signals 46, 48 are respectively converted into the step-shaped control signals 64, 66 in the converter devices 26, 28. The respective control signals 64, 66 are then sampled and converted into a corresponding speed information item and/or direction information item (step 114) in the control device 12.

In a step 116 which is parallel to this, the control device 12 receives speed and direction information from the drive circuits 18, 20, specifically about the actual values 54-60.

In a step 118, plausibility checking is carried out in the plausibility checking devices 82, 84 and 86. If the speed and direction information from the drive circuits 18, 20 is in the range a (up to the first predefined rotational speed 102), it is possible to determine accurately whether this state information corresponds to the corresponding state information which is transmitted via the converter devices 26, 28.

In the second subrange b, the decreasing chronological correlation is overcome by checking whether the state information which is transmitted by the drive circuits 18, 20 is within a specific accuracy band 108. If the state information from the drive circuits 18, 20 is in the subrange c, the plausibility-checking devices 86 and 82, 84 check whether this is plausible. If the rotational speed was previously in the subrange b, this is assumed to be plausible.

Depending on this, starting from the step 118 either a fault signal is generated or else it is determined that there is no fault present in the drive circuits 18, 20.

The first predefined rotational speed 104 can be, for example, in the range from 500 to 2000 revolutions. The second predefined rotational speed 106 can be, for example, in the range from 1500 to 5000 revolutions.

In addition, it is generally acceptable to be able to check the function of the drive circuits 18, 20 only in a range of relatively low rotational speeds. This may be the case, in particular, if safety-related faults can occur only in the lower rotational speed ranges.

The above-described methods for checking the function of the drive circuits 18, 20 may occur asynchronously. In other words, in particular starting from the first predefined rotational speed 104, the compared states (from the converter devices 26, 28 on the one hand and the drive circuits 18, 20 on the other) do not have to be respectively based on identical measuring times of the electric motors 14, 16. As a result, complex synchronization measures can be omitted.

If, on the other hand, for example the abovementioned synchronization signals 67, 68 can be transmitted between the control device 12 and the drive circuits 18, 20, it is possible to place, in the control device, the state information from the converter devices 26, 28 in a chronological relationship with the state information from the drive circuits 18, 20 so that the state information is respectively based on identical measuring times of the sensor arrangements of the electric motors 14, 16.

Figure 5:
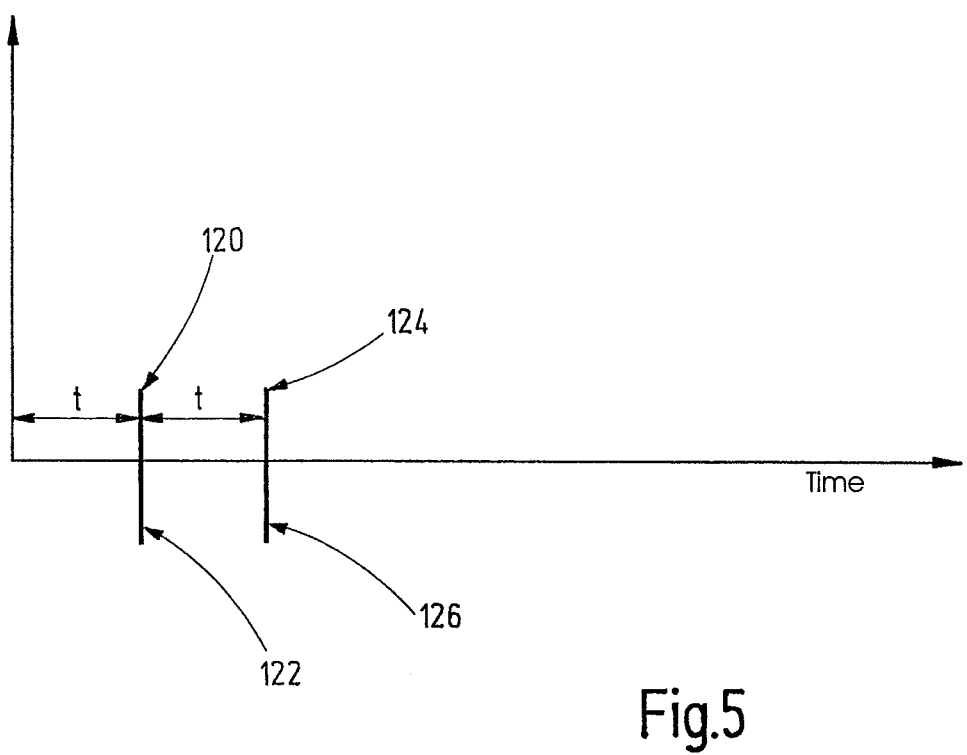
FIG. 5 is a time diagram illustrating an alternative embodiment of an actuator arrangement according to the invention.

This is illustrated schematically in FIG. 5. Said figure shows that at a time 122 a motor state 120 is read in via the respective converter device 26, 28. A signal 124 (that is to say about the actual values 54-60) which is based on the same measurement is read in from the respective drive circuit 18, 20 with a chronological offset with respect to the latter at a time 126. By means of the synchronization signals 67, 68, these times 122, 126 can be synchronized with one another in the control device 12. If there is a difference between the states here, a fault signal is output, and said fault signal can then be fed to the reset component 74 via the connection 75.

The alternative embodiment can also be applied in addition to the first embodiment described with respect to FIGS. 1 to 4.

Of course, in the alternative embodiment, respective comparisons are carried out on the basis of a simultaneous measurement. For this reason, a fault state can be output as soon as there is any difference, or a small difference, between the state values from the converter devices 26, 28 on the one hand and those from the drive circuits 18, 20 on the other.

What is claimed is:

1. Actuator arrangement for a motor vehicle drive train, having
    a control device,
    a monitoring device,
    an actuator,
    a drive circuit for the actuator, and
    a power stage arranged between the drive circuit and the actuator,
    the drive circuit receives at least one nominal signal relating to the actuator from the control device and converts it into a drive signal for the actuator,
    the control device is checked for control device faults by means of the monitoring device, wherein at least one of the drive circuit and the power stage receives a reset signal when such a control device fault occurs,
    the control device checks the function of the drive circuit and generates a reset signal for at least one of the drive circuit and the power stage if a drive circuit malfunction occurs, wherein the control device receives a first control signal from the actuator and checks the first control signal to determine whether the drive circuit is functioning correctly, and wherein the control device receives a second control signal from the drive circuit and evaluates the first control signal and the second control signal to determine whether the drive circuit is functioning correctly.

2. Actuator arrangement according to claim 1, wherein the second control signal is an actual value signal relating to an actuator variable.

3. Actuator arrangement according to claim 2, wherein the actual value signal and the nominal signal are transmitted on a bidirectional line between the control device and the drive circuit.

4. Actuator arrangement according to claim 3, wherein the rotational speed band or accuracy band is larger the greater the degree by which the rotational speed which results from the processed control signal differs from the first predefined rotational speed.

5. Actuator arrangement according to claim 2, wherein the actual value signal is a digital signal.

6. Actuator arrangement according to claim 1, wherein the first control signal has a digital signal from at least one sensor.

7. Actuator arrangement according to claim 6, wherein the first control signal has a plurality of digital signals which monitor the state of the actuator.

8. Actuator arrangement according to claim 6, wherein the digital control signal is a digital commutation signal.

9. Actuator arrangement according to claim 6, wherein the digital control signal is fed to a converter device which converts the digital control signal into a converted control signal which is fed to the control device.

10. Actuator arrangement according to claim 9, wherein the converted control signal contains information about at least one of the rotational direction, the rotational speed and the position of the actuator.

11. Actuator arrangement according to claim 1, wherein the nominal signal is an analogue signal.

12. Actuator arrangement according to claim 1, wherein the actuator is embodied as a motor and has a predefined rotational speed range, wherein at least one of the control device and a converter device which converts the first control signal into a control signal for the control device is configured to process the first control signal up to a first predefined rotational speed within the rotational speed range in such a way that the rotational speed of the motor can be reproduced exactly from the processed control signal, and wherein, above the first predefined rotational speed, a plausibility-checking device in at least one of the control device and the converter device checks the processed control signal to determine whether the resulting rotational speed is within a predefined rotational speed band or accuracy band.

13. Actuator arrangement according to claim 1, wherein the actuator is embodied as a motor and has a predefined rotational speed range, wherein at least one of the control device and a converter device which converts the first control signal into a control signal for the control device is configured to process the first control signal up to a second predefined rotational speed within the rotational speed range, in such a way that the Nyquist criterion is met, and wherein, above the second predefined rotational speed, a plausibility-checking device in at least one of the control device and the converter device checks whether it is plausible that the rotational speed is above the second predefined rotational speed.

14. Actuator arrangement according to claim 13, wherein, if the rotational speed was previously in a rotational speed band below the second predefined rotational speed, the plausibility-checking device detects it as plausible that the rotational speed is above the second predefined rotational speed.

15. Actuator arrangement according to claim 1, wherein the drive circuit has an ASIC module.

16. Actuator arrangement according to claim 1, wherein the actuator is a brushless motor.

17. Actuator arrangement according to claim 1, wherein the control device is configured to compare a state signal from the actuator with a state signal of the drive circuit simultaneously or in a chronological assignment to one another, in order to check the function of the drive circuit.

18. Actuator arrangement according to claim 17, wherein a synchronization signal is transmitted between the control device and the drive circuit, by means of which synchronization signal a chronological assignment between the state signals is effected in the control device.

19. In an actuator arrangement for a motor vehicle drive train, having
- a control device,
- a monitoring device,
- an actuator,
- a drive circuit for the actuator, and
- a power stage arranged between the drive circuit and the actuator, an operating method for operating the actuator arrangement comprises the steps of:
- receiving in the drive circuit at least one nominal signal relating to the actuator from the control device and converting it into a drive signal for the actuator,
- checking the control device for control device faults by means of the monitoring device, wherein at least one of the drive circuit and the power receives a reset signal when such a control device fault occurs, and
- checking the function of the drive circuit by means of the control device and generating a reset signal for at least one of the drive circuit and the power stage by means of the control device if a drive circuit malfunction occurs,
- receiving in the control device a first control signal from the actuator and checking in the control device the first control signal to determine whether the drive circuit is functioning correctly, and
- receiving in the control device a second control signal from the drive circuit and evaluating in the control device the first control signal and the second control signal to determine whether the drive circuit is functioning correctly.

* * * * *